US009250114B2

(12) United States Patent
Seevers et al.

(10) Patent No.: US 9,250,114 B2
(45) Date of Patent: Feb. 2, 2016

(54) TECHNIQUES FOR CALIBRATING MEASURING DEVICES

(75) Inventors: Daniel Byron Seevers, Suwanee, GA (US); Scott Ballard Henry, Loganville, GA (US)

(73) Assignee: NCR CORPORATION, Duluth, GA (US)

(*) Notice: Subject to any disclaimer, the term of this patent is extended or adjusted under 35 U.S.C. 154(b) by 0 days.

(21) Appl. No.: 13/369,942

(22) Filed: Feb. 9, 2012

(65) Prior Publication Data
US 2013/0212402 A1   Aug. 15, 2013

(51) Int. Cl.
*G06F 21/00* (2013.01)
*G01G 19/414* (2006.01)
*G06F 21/62* (2013.01)

(52) U.S. Cl.
CPC ........ *G01G 19/4144* (2013.01); *G06F 21/6209* (2013.01)

(58) Field of Classification Search
CPC ......... G06F 21/44; G06F 21/70; G06F 21/83; G06F 21/34; H04L 9/0822; G01G 19/4144
USPC ....................................................... 713/185
See application file for complete search history.

(56) References Cited

U.S. PATENT DOCUMENTS

| 7,870,776 | B1* | 1/2011 | Whitney et al. ............... 73/1.13 |
|---|---|---|---|
| 2002/0052703 | A1* | 5/2002 | Tabet ............................ 702/101 |
| 2004/0190092 | A1* | 9/2004 | Silverbrook et al. ......... 358/539 |
| 2006/0230202 | A1* | 10/2006 | Lee ................................ 710/62 |
| 2007/0006290 | A1* | 1/2007 | Li ..................................... 726/9 |
| 2008/0059379 | A1* | 3/2008 | Ramaci et al. ................. 705/66 |
| 2009/0306924 | A1* | 12/2009 | Olmstead ............. G01G 23/015 702/101 |
| 2011/0113235 | A1* | 5/2011 | Erickson ................. G06F 21/34 713/152 |

* cited by examiner

*Primary Examiner* — Peter Shaw
(74) *Attorney, Agent, or Firm* — Schwegman, Lundberg, Woessner

(57) ABSTRACT

Techniques for calibrating measuring devices are provided. A universal serial bus (USB) drive is inserted into a USB port on a device of a checkout system. A key in the USB drive initiates a calibration sequence on one or more weighing devices (measuring devices) of the checkout system. Audit information is captured during the calibration and usage of the weighing devices. When a command is recognized to communicate the audit information, the audit information is audibly communicated from speakers associated with the checkout system.

17 Claims, 3 Drawing Sheets

TECHNIQUES FOR CALIBRATING MEASURING DEVICES

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like.

Many kiosk stations at grocery stores include devices that weigh produce. Such devices also exist at cashier-manned stations. Governments impose strict regulations about how these weight devices are calibrated and audited. Consequently, these devices often have to have a separate switch that turns on calibration functions and this switch is often sealed when delivered to the grocery stores. Once the seal is broken and the switch is tripped, the device permits calibration and records audit details for the calibration.

Retrieval of audit details is often achieved via a separate stand alone monitor that is often activated by some particular keying sequence and permits the audit data to be displayed on the extra monitor. It is believed that the customer monitor could corrupt retrieval of calibration and audit data; therefore, a separate stand alone monitor is used.

It can be seen that a lot of additional expense goes into complying with government regulations with respect to calibrating weight or other consumer measuring devices. These regulations add to the cost of manufacture of the devices (sealing with stand alone switch) and add to the cost of the enterprise that deploys the devices because of the need to buy and maintain dual monitors with one reserved for retrieval of audit details.

SUMMARY

In various embodiments, techniques for proximity detection of kiosk payments are presented. According to an embodiment, a method for proximity detection for kiosk payment is provided.

Specifically, a Universal Serial Bus (USB) device is detected as being interfaced to a device of the checkout system. Next, a security key is obtained from the USB device and a calibration process sequence is activated for a weigh scale of the checkout system based on validation of the security key.

DETAILED DESCRIPTION

Figure 1:
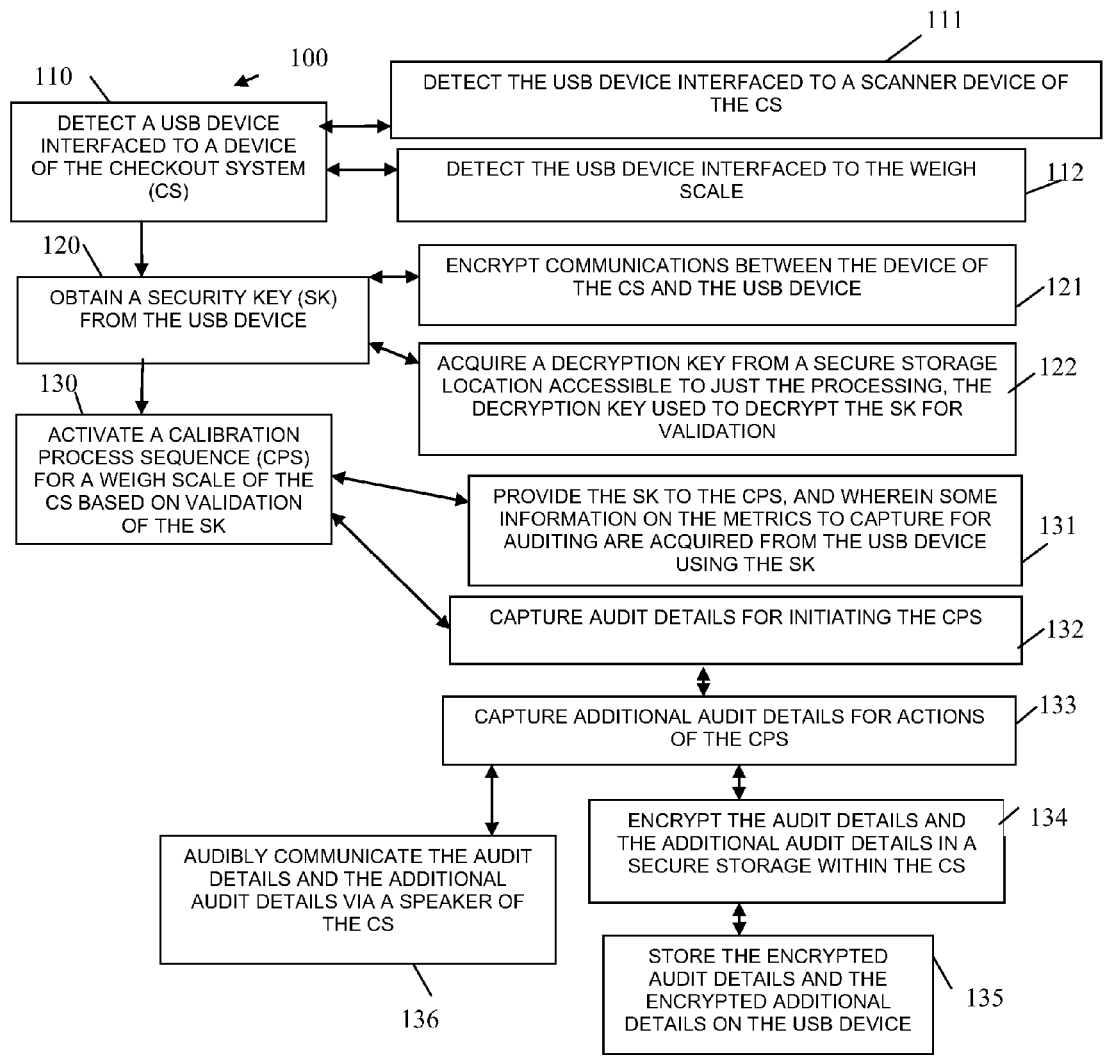
FIG. 1 is a diagram of a method for calibrating a measuring device, according to an example embodiment.

FIG. 1 is a diagram of a method 100 for calibrating a measuring device, according to an example embodiment. The method 100 (hereinafter "calibration manager") is implemented as instructions programmed and residing on a non-transitory computer-readable (processor-readable) storage medium and executed by one or more processors. The processors are specifically configured and programmed to process the calibration manager.

The calibration manager executes on one or more processors on a device of a checkout system. The checkout system includes a variety of devices, such as display, perhaps touch screen, scanner, the measuring device (weigh scale), card swipe device, cash/coin accepter device, etc.

Conventional requirements for weigh scales (type of measuring device) to capture and present acurate weights necessitates the need for periodic calibration. Regulations require that this operation be protected and tracked by method of sealing and audit trail tracking. This information is stored and available to regulatory agency. Typically there is a physical switch with a sealable cover used to enter the calibration operation. The switch requires the use of a physical seal to be broken (lead & wire) to monitor for tampering.

As will be demonstrated more completely herein and below, the techniques presented allow the initiation for entering the calibration sequence by inserting a Universal Serial Bus (USB) thumb drive into the scanner. The drive has a program, which initiates the calibration sequence upon detection of a certified thumb drive having a particular key known to the scanner. The program can also include the scale mode and other parameters such as pound or kilogram and the vibration settings. Utilizing this technique eliminates the need for a calibration switch and cover, which produces a product cost reduction as well as field cost reduction (eliminating the need for physical seals). Recorded audit trail information provides evidence of tampering and tracking.

At 110, the calibration manager detects a USB device interfaced to a device of the checkout system. As soon as the USB device is interfaced to a USB port of a device of the checkout system, this is recognized as a particular unique USB device based on its identity or key it includes in a defined file or directory on the USB device.

According to an embodiment, at 111, the calibration manager detects the USB device interfaced to a scanner device of the checkout system.

In another situation, at 112, the calibration manager detects the USB device interfaced to the weigh scale.

At 120, the calibration manager obtains a security key from the USB device. Again, this can have a unique name, unique naming format, be located in a specific predefined file, be hidden in a hidden directory, and the like.

According to an embodiment, at 121, the calibration manager encrypts communications between the device and the checkout system and the USB device. That is, all communications and interactions between the calibration manager and the USB device are encrypted. This can be useful to gain government compliance acceptance of the approaches discussed herein.

In another case, at 122, the calibration manager acquires a decryption key from a secure storage location accessible to just the processing of the calibration manager. The decryption key is used to decrypt the security key for validation.

At 130, the calibration manager activates a calibration process sequence for a weigh scale of the checkout system based on validation of the security key.

According to an embodiment, at 131, the calibration manager provides the security key to the calibration process sequence and some information on the metrics to capture for auditing are acquired from the USB device using the security key.

In one situation, at 132, the calibration manager captures audit details for initiating the calibration process sequence.

Continuing with the embodiment of 132 and at 133, the calibration manager captures additional audit details for actions of the calibration process sequence.

Continuing with the embodiment of 133 and at 134, the calibration manager encrypts the audit details and the additional audit details in a secure storage within the checkout system.

Still continuing with the embodiment of 134 and at 135, the calibration manager stores the encrypted audit details and the encrypted additional details on the USB device.

Continuing with the embodiment of 133 and at 136, the calibration manager audibly communicates the audit details and the additional audit details via a speaker of the checkout system.

In an embodiment, the checkout system is a self-service kiosk. In another embodiment, the checkout system is a cashier-manned checkout station.

Figure 2:
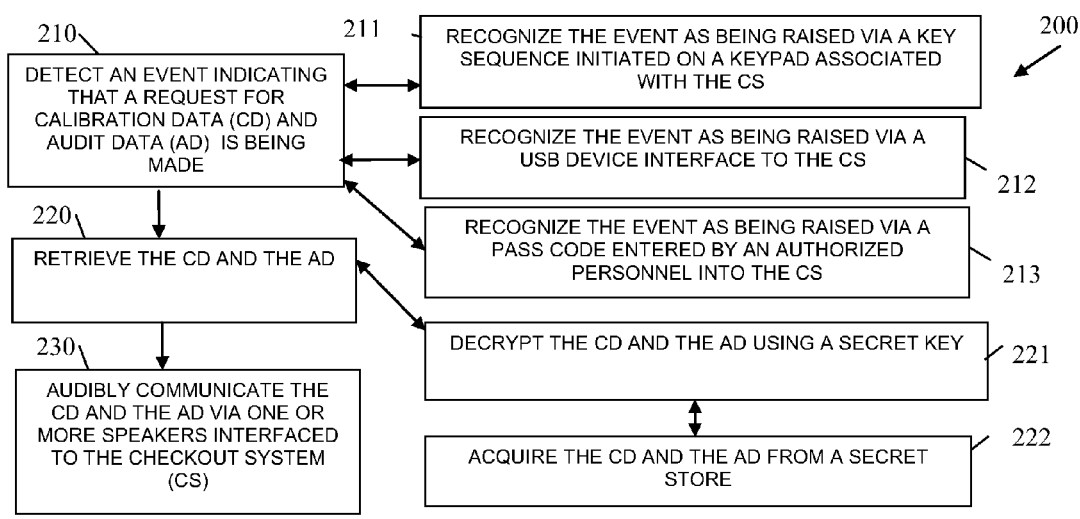
FIG. 2 is a diagram of a method for reporting audit details for a measuring device, according to an example embodiment.

FIG. 2 is a diagram of a method 200 for reporting audit details for a measuring device, according to an example embodiment. The method 200 (hereinafter "audit reporter") is implemented as instruction and programmed within a non-transitory computer-readable (processor-readable) storage medium that executes on one or more processors of a device of a checkout system (e.g., display, perhaps touch screen, card swipe device, weigh scale, speakers, microphones, a cash/coin accepter device, etc.); the processors of the checkout system are specifically configured to execute the audit reporter.

The audit reporter presents a mechanism for reporting the calibration and usage metrics of a weighing device, such calibration discussed above with reference to the method 100 and the FIG. 1.

It is a certification requirement to store and display the number of times the scale has been calibrated and or the parameters changed. This is usually done with a numeric display. On the 7878/74 display system, this is accomplished by depressing and holding the scale zero switch and the results are displayed on the 7825 remote display.

This audit reporter presents a technique of also speaking the calibration count and parameters when the scale zero switch is depressed. With this approach the audit trail can be indicated by speech thus removing the need for the 7825 remote display for audit trail information.

At 210, the audit reporter detects an event indicating that a request for calibration and audit data is being made or being received.

According to an embodiment, at 211, the audit reporter recognizes the event as being raised via a key sequence initiated on a keypad associated with the checkout system.

In another situation, at 212, the audit reporter recognizes the event as being raised via a USB device interfaced to the checkout system.

In still another case, at 213, the audit reporter recognizes the event as being raised via a pass code entered by authorized personnel into the checkout station.

At 220, the audit reporter retrieves the calibration data and the audit data.

According to an embodiment, at 221, the audit reporter decrypts the calibration data and the audit data using a security key.

Continuing with the embodiment of 221 at 222, the audit reporter acquires the calibration data and the audit data from a secret store.

At 230, the audit reporter audibly communicates the calibration data and the audit data via one or more speakers interfaced to the checkout system. So, a specialized monitor is not needed for compliance, since audible communication is used.

Figure 3:
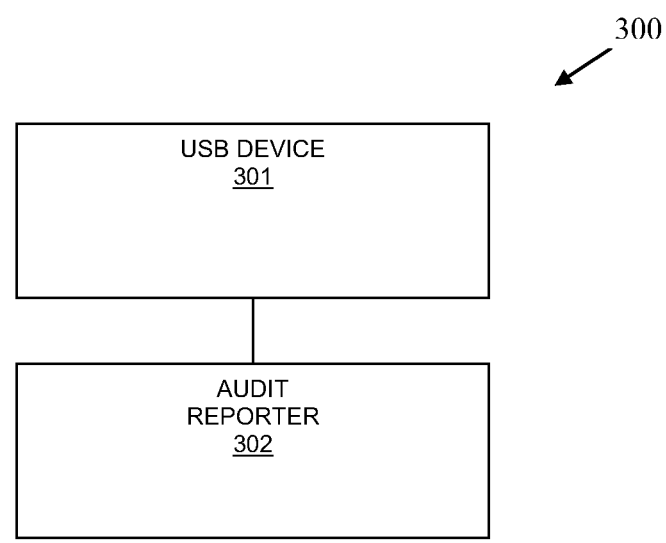
FIG. 3 is a diagram of a calibration and audit reporting system, according to an example embodiment.

FIG. 3 is a diagram of a calibration and audit reporting system 300, according to an example embodiment. The components of the calibration and audit reporting system 300 are implemented as executable instructions and programmed within a non-transitory computer-readable (processor-readable) storage medium that execute on one or more processors of a checkout system (e.g., self-service kiosk, cashier-manned station, and component devices, etc.); the processors of the checkout system are specifically configured to execute the components of the calibration and audit reporting system 300. The calibration and audit reporting system 300 may also be operational over a network; the network is wired, wireless, or a combination of wired and wireless.

The calibration and audit reporting system 300 includes a USB device 301 and, in one embodiment, an audit reporter 302.

The calibration and audit reporting system 300 includes a checkout system having one or more processors that interface with USB device 301, which is implemented, programmed, and resides within a non-transitory computer-readable storage medium. Example processing associated with the USB device 301 was presented above in detail with reference to the FIG. 1.

The USB device 301 when interfaced to the checkout system provides a key that automatically initiates a calibration process sequence on a weigh scale of the checkout system and triggers secure capturing of audit data for the calibration process sequence and actions taken by the calibration process sequence.

In an embodiment, the calibration and audit reporting system 300 also includes an audit reporter, which is implemented and residing in a non-transitory computer readable storage medium and to execute on processors of the checkout system, the audit reporter retrieves the audit data and audibly communicates the audit data via speakers associated with the checkout system. Example processing associated with the audit reporter 302 was presented in detail above with reference to the method 200 of the FIG. 2.

According to an embodiment, the USB device 301 is a thumb drive.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a checkout system configured to execute the method, comprising:

detecting a security key provided by a Universal Serial Bus (USB) device when the USB device is interfaced to a scanner device of the checkout system, the detection of the security key presented by the USB device when the USB device is interfaced to the scanner device initiates a calibration process that executes on the scanner device once a security key is certified by the scanner device of the checkout system;

obtaining the security key from the USB device; and activating a calibration process sequence for a weigh scale of the checkout system based on validation of the security key, and wherein activating further includes receiving from the USB device a mode of operation for the weigh scale and vibration settings for the weigh scale.

2. The method of claim 1, wherein detecting further includes detecting the USB device interfaced to the scanner device of the checkout system.

3. The method of claim 1, wherein detecting further includes detecting the USB device interfaced to the weigh scale.

4. The method of claim 1, wherein obtaining further includes encrypting communications between the device of the checkout system and the USB device.

5. The method of claim 1, wherein obtaining further includes acquiring a decryption key from a secure storage location accessible to just the method, the decryption key used to decrypt the security key for validation.

6. The method of claim 1, wherein activating further includes providing the security key to the calibration process sequence, and wherein some information on the metrics to capture for auditing are acquired from the USB device using the security key.

7. The method of claim 1, wherein activating further includes, capturing audit details for initiating the calibration process sequence.

8. The method of claim 7, wherein capturing further includes capturing additional audit details for actions of the calibration process sequence.

9. The method of claim 8, wherein capturing further includes encrypting the audit details and the additional audit details in a secure storage within the checkout system.

10. The method of claim 9, wherein encrypting further includes also storing the encrypted audit details and the encrypted additional details on the USB device.

11. The method of claim 8 further comprising, audibly communicating the audit details and the additional audit details via a speaker of the checkout system.

12. A processor-implemented method programmed in a non-transitory processor-readable medium and to execute on one or more processors of a checkout system configured to execute the method, comprising:

detecting an event indicating that a request for calibration data and audit data is being made, the event raised when a Universal Serial Bus (USB) device is interfaced to the checkout system, via a scanner device, and the USB device provides a security key for automatically initiating the request for the calibration data once the security key is certified by the scanner device of the checkout system, the scanner device executing the calibration and obtains the calibration data, and wherein detecting further includes receiving from the USB device a mode of operation for the scanner device and vibration settings for the scanner device;

retrieving the calibration data and the audit data; and audibly communicating the calibration data and the audit data via one or more speakers interfaced to the checkout system.

13. The method of claim 12, wherein retrieving further includes decrypting the calibration data and the audit data using the secret key.

14. The method of claim 13 further retrieving further includes acquiring the calibration data and the audit data from a secret store.

15. A system comprising:

a Universal Serial Bus (USB) device configured to be interfaced to a checkout system;

wherein the USB device when interfaced to a scanner device of the checkout system, the USB device automatically provides a key, and presence of the provided key causes: i) automatic initiation of a calibration process sequence on a weigh scale of the checkout system and automatic acquisition of a mode of operation for the weigh scale and vibration settings for the weigh scale from the USB device, ii) automatic trigger of secure capture of audit data for the calibration process sequence, iii) and automatic actions taken by the calibration process sequence once the key is authenticated by the scanner device of the checkout system, wherein the weigh scale executes the calibration process defined by the calibration process sequence.

16. The system of claim 15 further comprising, an audit reporter implemented and residing in a non-transitory computer readable storage medium and to execute on processors of the checkout system, the audit reporter retrieves the audit data and audibly communicates the audit data via speakers associated with the checkout system.

17. The system of claim 15, wherein the USB device is a thumb drive.

* * * * *